United States Patent [19]

Ishikura et al.

[11] 4,442,247
[45] Apr. 10, 1984

[54] AQUEOUS COATING COMPOSITIONS

[75] Inventors: Shinichi Ishikura, Kyoto; Kazunori Kanda, Yao; Shohachiro Yamaguchi, Neyagawa, all of Japan

[73] Assignee: Nippon Paint Company, Ltd., Osaka, Japan

[21] Appl. No.: 411,482

[22] Filed: Aug. 25, 1982

[30] Foreign Application Priority Data

Sep. 2, 1981 [JP] Japan ............................. 56-138859

[51] Int. Cl.³ .................... C08L 63/00; C09D 3/58; C09D 3/66; C09D 3/76
[52] U.S. Cl. ................. 523/414; 204/181 C; 523/404; 523/406; 523/408; 523/412; 523/413; 524/35; 524/502; 524/507; 524/508; 524/510; 524/512; 524/513; 524/514; 524/520; 524/523; 524/537; 524/538; 524/539; 524/541; 524/901
[58] Field of Search ............... 204/181 C; 524/901, 524/35, 502, 507, 508, 510, 512, 513, 514, 520, 523, 537, 538, 539, 541; 523/414, 404, 406, 408, 412, 413

[56] References Cited

U.S. PATENT DOCUMENTS

| | | | |
|---|---|---|---|
| 3,639,209 | 2/1972 | Buckman et al. | 127/71 |
| 4,174,332 | 11/1979 | Hönig et al. | 523/414 |
| 4,277,383 | 7/1981 | Hayashi et al. | 524/901 |
| 4,294,940 | 10/1981 | Hino et al. | 204/181 C |
| 4,308,121 | 12/1981 | Hazan | 204/181 C |
| 4,310,646 | 1/1982 | Kempter et al. | 524/901 |
| 4,335,030 | 6/1982 | Concannon | 524/901 |
| 4,345,948 | 8/1982 | Breuninger | 536/102 |

FOREIGN PATENT DOCUMENTS

| | | | |
|---|---|---|---|
| 2732874 | 8/1978 | Fed. Rep. of Germany | 204/181 C |
| 2732902 | 8/1978 | Fed. Rep. of Germany | 204/181 C |
| 5271541 | 12/1975 | Japan | 204/181 C |
| 2038336 | 7/1980 | United Kingdom | 524/901 |
| 2050381 | 1/1981 | United Kingdom | 524/901 |

*Primary Examiner*—Ronald W. Griffin
*Attorney, Agent, or Firm*—Wenderoth, Lind & Ponack

[57] ABSTRACT

An aqueous coating composition comprising from 45 to 98 parts by weight (solids) of aqueous resin(s) and from 2 to 55 parts by weight (solids) of finely divided water-insoluble resin(s), in which at least a part of said aqueous resin is selected from special type of cationic resins. The resins may have mutually reactive functional groups.

8 Claims, No Drawings

AQUEOUS COATING COMPOSITIONS

FIELD OF INVENTION

The present invention relates to aqueous coating compositions comprising resinous film forming components.

BACKGROUND OF THE INVENTION

Coating compositions comprising organic solvents are dangerous to use, being inflammable and liable to explode, and are physiologically and environmentally harmful. Aqueous coating compositions are therefore, in increasing demand. However, in order to dissolve or disperse a suitable resin in water, it is necessary that the resin should carry a number of hydrophilic groups, to use a neutralizing agent capable of forming a water-soluble salt with the resin, and to use a resin of relatively lower molecular weight. As a result, the performance of films applied using aqueous coating compositions e.g. their durability and water-resistance, tends to be lower than would be desirable. Further, aqueous coating compositions cannot have a high non-volatile content, and their working properties are therefore often unsatisfactory. Again, it is often difficult to disperse colouring matter in aqueous coating compositions, thereby limiting their use, and often excluding fields requiring a high order of finishing appearance, gloss and sharpness, and other properties which are required in, for example, automobile industry.

In general, emulsion coating compositions including a resin prepared by the so-called emulsion polymerisation in an aqueous medium, can include relatively high molecular weight resins. The polymerisation technique must, however, be very carefully controlled. However, the surfactant or emulsifier which is added can reduce the durability and water-resistance of the film which is ultimately obtained.

Powder coating compositions have been suggested as an alternative to coating compositions including an organic solvent, but again problems arise in their use. Blocking may occur if the glass transition point of the resin is too low, giving a coating of poor film properties, and the need to have a high baking temperature and a special applicator limits their field of use.

Coating compositions comprising a powder dispersed in water, as a slurry, are also known. Such compositions cannot have a high non-volatile content, making it difficult to obtain a thick coating and/or satisfactory film adhesion (which can lead to cracks in the film). Dispersed powder coating compositions are difficult to apply by spraying, and tend to have low gloss. The slurried powder tends to separate out during storage and, since a dispersing agent is usually present, the water-resistance of the films obtained is often low. Slurry compositions have not generally been used in practice. Many attempts have been made to overcome the problems associated with aqueous dispersion type coating compositions. In particular, a water-soluble or water-dispersible resin have been added; for example, Japanese Patent Applications Nos. 127151/74, 25224/76 and 31636/76 disclose compositions comprising a water-insoluble, dispersed resin as the main ingredient, with a minor amount of a water-soluble or water-dispersible resin. Japanese Patent Applications Nos. 74606/79 and 170262/79 disclose coating compositions comprising a pulverised coating resin and a carboxyl group-bearing water soluble resin in a weight ratio, as solids, of from 0.1 to 100:1; in the specific examples, however, the content of water-soluble resin is about 10 to 20% of the powdered resin and is thus no more than a dispersion stabilizer in a dispersion system. The same is true with respect to the disclosure of Japanese Patent Publication No. 4149/80, of an aqueous dispersion coating composition comprising at least two water-insoluble resinous powders and one or more water-soluble resins.

In using an aqueous dispersion coating medium, the dispersion stability of the powder is always a problem. Various attempts have therefore been made to use finely pulverised resins or dispersion aids. However, since the known systems have been developed on the assumption that, if the powder is surrounded by a water-soluble resin, dispersion stability is improved owing to the affinity of the water-soluble resin to the aqueous medium, it is not surprising that the known compositions comprise only a low content of the water-soluble resin with respect to the dispersed resin.

SUMMARY OF THE INVENTION

According to the present invention, an aqueous coating composition comprises from 45 to 98 parts by weight (solids) of aqueous resin(s) and from 2 to 55 parts by weight (solids) of finely divided water insoluble resin(s), in which at least a part of said aqueous resin(s) is the cationic resin having amino group, the amino nitrogen equivalent weight being 40 to 2000, and fulfilling the requirements that the water tolerance (as herein defined) is greater than 4 and the surface tension of a 1% w/w aqueous solution is less than 51 dyne/cm.

DESCRIPTION OF THE PREFERRED EMBODIMENTS

The invention is based on the discovery that, by using certain type of water-soluble or water-dispersible resins (hereinafter called as aqueous resins), the content of water-insoluble resin in an aqueous coating composition can be increased without causing an increase in viscosity of the composition, and that thus obtained composition is stable, even in the absence of surfactant or dispersing agent because of the particular rheorogical properties thereof. On storage and in use, therefore, a composition of the invention can avoid sedimentation and separation of solid matter, and resin coagulation, thereby allowing the production of a good quality, thick coating which, on curing, can give a film having good durability, chemical resistance and other desired properties. Dispersion of colouring matter in the present coating composition is also very excellent. An aqueous coating composition of the present invention comprises finely-divided water-insoluble resin dispersed in an aqueous/resin system and should not be confused with the known type of composition comprising water and a powdered resin to which a water soluble resin has been added, as a modifier.

The aqueous resins used in the present composition are cationic resins having amino groups, as, for example, (1) amine addition products of epoxy resins or modified epoxy resins,
(2) polymerization type resins having amino groups,
(3) polyester resins having amino groups, and
(4) polyethyleneimine resins.

Epoxy resins stated in the abovesaid sub-group (1) may be of any conventional types. Examples of such resins are bisphenol A type epoxy resin, bisphenol F type resin, and halogenated products thereof; polyalcohol-, dimer acid-, trimer acid-, and novolak-type phenol resins having epoxy groups introduced by the reaction with epichlorhydrine; polyolefin resins having epoxy groups introduced by the reaction with peroxide; and alicyclic epoxy resins. Among them, the most preferable one is bisphenol A type epoxy resin.

As the primary or the secondary amines used for the preparation of said amine adducts, mention is made of mono- and di-alkylamines (e.g. propylamine, butylamine, diethyl amine, dipropylamine); mono- and di-alkanolamines (e.g. ethanolamine, propanolamine, diethanol amine, dipropanol amine); alicyclic monoamines (e.g. cyclohexylamine, pyrrolidine, morpholine) and polyamines (e.g. ethylenediamine, hexamethylene diamine, diethylene triamine, triethylene tetramine, tetraethylene pentamine, propylene diamine, dipropylene triamine, butylene diamine, N-aminoethanol amine, diethylethylene diamine, diethylamino propylamine, piperazine, N-methyl piperazine, N-aminoethyl piperazine). An aromatic amines (e.g. aniline, N-methylaniline, toluidine, benzylamine, m-xylene diamine, methaphenylene diamine, 4,4'-diaminodiphenyl methane) may be used together with said aliphatic amino compound.

The modified epoxy resins may be any of fatty acid modified resins; polyamide modified resins; epoxy resins modified with partially blocked polyisocyanate compounds (free isocyanate being less than 1 per molecule, in average); reaction products of said fatty acid modified resins with partially blocked polyisocyanate compounds; and reaction products of polyamide modified resins with partially blocked polyisocyanate compounds. The abovesaid fatty acids may be non-drying, semi-drying or drying oil fatty acids, as, for example, safflower oil fatty acid, linseed oil fatty acid, soybean oil fatty acid, tall oil fatty acid, cotton seed oil fatty acid, coconut oil fatty acid, tung oil fatty acid, oiticica oil fatty acid, dehydrated castor oil fatty acid and Hidiene fatty acid (manufactured by Soken Kagaku-sha).

The polyamide resins used for the modification of epoxy resins are preferably amino-group bearing polymers obtained by the condensation of dibasic acids (e.g. phthalic acid, adipic acid, sebacic acid, dimerized fatty acid) and polyamines (e.g. ethylene diamine, hexamethylenediamine, diethylene triamine, triethylene tetramine, propylene diamine, butylene diamine), and however, other polyamides prepared, for example, by condensation of said polyamine with oligomer obtained by the ring-opening polymerization of lactam (e.g. ε-caprolactam), and polyester polyamide obtained by using, in place of said polyamine, an alkanolamine (e.g. ethanolamine, propanolamine) may be satisfactorily used. These polyamide resins all contain amino groups or amide groups which are reactive with epoxy groups, in their molecules.

As the polyisocyanate compounds, use is made of aromatic or aliphatic diisocyanates (e.g. m- or p-phenylene diisocyanate, 4,4'-diphenylmethane diisocyanate, 2,4- or 2,6-tolylene diisocyanate, hexamethylene diisocyanate, dimer acid diisocyanate, isophorone diisocyanate), addition products of excess amounts of said diisocyanates with polyols (e.g. ethyleneglycol, propyleneglycol, glycerol, trimethylol propane, pentaerythritol), or trimers of said diisocyanates, and they are blocked with volatile low molecular, active hydrogen bearing compounds as aliphatic or aromatic monoalcohols (e.g. methanol, ethanol, propanol, butanol, hexanol, cyclohexanol, benzyl alcohol, ethylene glycol monoethyl ether, ethylene glycol monobutyl ether), hydroxy tertiary amines (e.g. dimethyl or diethyl amino ethanol), oxims (e.g. acetoxim, methyl ethyl ketone oxim), phenol, cresol and lactams (e.g. ε-caprolactam).

For the preparation of amine adducts of modified epoxy resins, the abovesaid modifying agents may be directly reacted with previously made amine adducts of epoxy resins, or the modifying agents are first reacted with epoxy resins and then the abovesaid primary or secondary amines are reacted therewith. For example, in obtaining a fatty acid modified resin, the epoxy may be first reacted with fatty acid at 80° to 130° C. and then with an amine, or said epoxy may be first reacted with an amine to obtain an amine adduct of epoxy resin, to which a fatty acid may be reacted in later stage. In the latter case, it is preferred to use a secondary amine. The reaction between hydroxy or amino group and the fatty acid may be carried out at 180° to 230° C. for several hours. The resins of sub-group (2), i.e. polymerization type polymers containing amino groups, can be prepared in a conventional way by using a polymerizable monomer having amino group(s) as one of the monomers. The amount of said monomer may be 3 to 60 weight % of the total monomers used. Examples of such monomers with amino groups are dimethyl amino ethyl acrylate, dimethyl amino ethyl methacrylate, diethyl amino ethyl acrylate, diethyl amino ethyl methacrylate, N-(dimethylamino propyl)acrylamide, N-(dimethyl amino propyl)methacrylate, 2-vinyl pyridine and 4-vinyl pyridine. Together with said amino bearing monomer, the following may be reacted and copolymerized: acrylic or methacrylic esters (e.g. methyl ester, ethyl ester, n-propyl ester, isopropyl ester, n-butyl ester, isobutyl ester, t-butyl ester, 2-ethylhexyl ester, n-octyl ester, lauryl ester, stearyl ester, tridecyl ester, glycidyl ester, 2-butoxyethyl ester, benzyl ester); hydroxy alkyl acrylates or methacrylates (e.g. 2-hydroxyethyl (meth)acrylate, 2-hydroxypropyl (meth)acrylate, 3-hydroxypropyl (meth)acrylate, 4-hydroxy butyl (meth)acrylate; acrylamide, methacrylamide, acrylonitrile, methacrylonitrile, styrene, vinylacetate, vinyl toluene, ethylene, propylene, butadiene and vinyl chloride. The sub-group (3), i.e. polyester resins having amino groups, may include polymers obtained by the polycondensation of polybasic acids (e.g. phthalic anhydride, isophthalic acid, terephthalic acid, tetrahydrophthalic anhydride, hexahydrophthalic anhydride, trimellitic anhydride, methyl cyclohexene tricarboxylic anhydride and pyromellitic anhydride) with alkanolamines (e.g. monoethanol amine, diethanol amine, triethanol amine, monoisopropanol amine, dimethyl ethanol amine). Epoxy resin may be used in some cases.

The polyethylene imine resins of sub-group (4) are straight or branched polymer having the repeating unit of

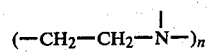

Though they are freely available in the market as, for example, Epomine (manufactured by Nippon Shokubai Kagaku K.K.), Corcat (manufactured by Cordova Chemical Co.) and the like, preparation of these resins are very easy. If desired, one may use ionene type resins, which are obtainable by, for example, Menshutkin reaction of polyamines (preferably, diamines) with polyhalogenides (preferably, dihalogenides), having the basic repeating unit of $$[-(N^{\oplus}(R_1)(R_2)-R-)_m]X^{\ominus}$$

wherein $R_1$ and $R_2$ are the same or different, and each represents $C_1 \sim C_6$ alkyl group, R is $C_1 \sim C_{12}$ polyalkylene group, X is halogen atom (F,Cl,Br,I), and m is an integer of 3 to 1000.

In preparing an aqueous coating composition of this invention, the abovesaid cationic aqueous resin is used, with or without neutralization by organic acid (e.g. formic acid, acetic acid, hydroxyl acetic acid, propionic acid, butyric acid, lactic acid, valeric acid, caproic acid, enathylic acid, caprylic acid, pelargonic acid, capric acid, lauric acid, myristic acid, palmitic acid, stearic acid) or inorganic acid (e.g. phosphoric acid, sulfuric acid, hydrochloric acid).

The aqueous resins, however, must have the characteristic that the amino-nitrogen equivalent weight is within a range of 40 to 2000. If the nitrogen equivalent weight is outside the abovesaid range, there is a marked tendency of the viscosity of coating composition being increased and corrosion resistance and alkaline resistance of the formed film being decreased. They must also fulfil the requirements that the water tolerance (as herein defined) is more than 4 and surface tension, for a 1% w/w aqueous solution, is less than 51 dyne/cm.

When an aqueous resin varnish having a viscosity within the range suitable for use in the preparation of coating composition is progressively diluted with water, the solubility of the resin decreases rather than increases, after reaching a maximum solubilization point, and the resin solution loses its transparency and becomes a turbid liquid. Water tolerance is a measure of this dilution limit for an aqueous resin and is expressed herein as the water dilution factor, with respect to the stage at which exactly 5 g of the aqueous varnish are in a 100 ml beaker, at the stage, following progressive dilution with deionized water, when No. 1 type (26 point type) can no longer be correctly read through the beaker.

It has been found that there are certain correlations between the water tolerance and surface tension of the aqueous resin varnish, the dipersion stability of the finely-divided resin and the fluid viscosity of a mixture thereof, and that a coating composition having good dispersion stability and working properties can be obtained with an aqueous resin having a water tolerance more than 4 and a surface tension, for a 1% w/w aqueous solution, less than 51 dyne/cm. The rationale, whereby observance of the given requirements for the resin allow the desired properties to be obtained, is not yet clearly understood. However, when the water tolerance is under 4, the viscosity of the coating composition becomes too high and its dispersion stability is poor. Similar tendencies are clearly observed when the surface tension exceeds the limit of 51 dyne/cm.

It appears that the number average molecular weight of the aqueous resin may have some influence on the properties of the coating composition and on the ultimate film performance, but this is not conclusive. For the purpose of obtaining the combination of optimum dispersion stability of finely divided resin and coloring matter, improved film performance as corrosion resistance, adhesion, smoothness and the like, and working properties, the number-average molecular weight of said aqueous resin should preferably be selected in a range of 500 to 30,000, most preferably 700 to 15,000. In addition to the or each aqueous resin having the given characteristics, a coating composition of the invention may additionally comprises one or more aqueous resins which do not meet the given criteria. When used, the amount of such additional aqueous resin must be in a level giving no adverse effect on the dispersion stability and storage stability of the coating composition. In practice, the aqueous resin of the present cationic type should preferably be more that 50 weight % of the total aqueous resins used.

These aqueous resins may carry functional groups capable of reacting with those of the or each of the essential resins. Such functional group may include hydroxy, oxirane, active methylol groups, unsaturated carbon-carbon bond, isocyanate (blocked or unblocked) group, halogen atom and the like.

In the present invention, finely divided water-insoluble resin is used with the above mentioned aqueous resin varnish. Examples of such resins are acrylic, polyester, alkyd, epoxy, urethane, amino, phenol, polyolefin, vinyl, cellulose, polyalkadiene, polyamide, polycarbonate and fluorine resins. One or more water-insoluble resins may be used in the present composition. In addition to the water-insolubility, such resins should be solid at ambient temperatures and, when heated, compatible with other resins in the composition. Preferably, such resins should have a glass transition point (Tg) of more than 40° C. If Tg is less than 40° C., there often cause difficulties in the preparation of the coating composition and decrease in the storage stability thereof.

The particle size of the water-insluble resin is not critical but is, in general, from 0.5 to 100μ, preferably 1 to 70μ. There is a tendency that when the particle size exceeds over 100μ, the mechanical properties will decrease and when it is less than 0.5μ, viscosity of the composition becomes high.

Regarding the reactivity of such resin, there is no particular limit on it. The water-insoluble resin may or may not carry functional groups capable of reacting, when heated, with those of other resins Such functional groups may be carboxyl, hydroxyl, active methylol, oxirane, isocyanate, blocked isocyanate, amino groups and reactive carbon-carbon bond. Since the presence or absence of functional groups is not critical, it may be understood that the resin composition of the invention may be thermoplastic or thermosetting.

Fine powders of such resins can be prepared according to conventional techniques and methods. For example, apparatus and technique for the preparation of powder coating may be used as they are. At this time, colouring matter and other additives (modifier, dispersing aids, regulator and the like) may be added if desired.

A composition of the present invention comprises from 45 to 98, preferably 50 to 90, parts by weight of the aqueous resin(s) and from 2 to 55, preferably 10 to 50, parts by weight of water-insoluble resin(s). These amounts are calculated in terms of the solid content. When the weight ratio of resins is outside the given range, it is difficult or even impossible to obtain a stable composition with optimum rheological properties. For example, if the content of aqueous resin is too low, the dispersion stability of the water-insoluble resin is too poor, with resultant damage on levelling the coated film; if the amount of aqueous resin is too high, the viscosity of the composition becomes too high and hence, it is inevitable to decrease the solid content, which will cause operational difficulties because of the occurence of pinholes and sagging.

The present coating composition, thus, comprises as film-forming components the above said cationic aqueous resin(s) and water-insoluble resin(s), and aqueous medium.

Cross-linking may optionally be produced between the aqueous resins, between the water-insoluble resins, or between the aqueous resin and the water-insoluble resin by means of the functional groups already stated or by making use of other cross-linking agent as blocked polyisocyate, epoxy resin and amino resin.

The composition may comprise, in addition to the aqueous medium, a small quantity of hydrophilic polar organic solvent, if desired. Examples of such organis solvents are ethylene glycol monomethyl ether, ethylene glycol monoethyl ether, ethylene glycol monobutyl ether, methanol, ethanol, isopropanol, n-butanol, sec-butanol, t-butanol, and dimethyl formamide. In addition, the coating composition may comprise coloring matter and other additives (e.g. modifier, dispersing aids, surface conditioning agent and the like) if desired. The coating composition of this invention can be prepared in any conventional ways. For example, in the preparation of a colored coating composition, coloring matter is first added with a portion of the aqueous resin varnish to make a colour paste, to which are added the remaining proportion of the aqueous resin varnish, fine powders of water-insoluble resin and any other additives, and the whole is stirred well by using a known mixing device. Thus obtained coating composition may be applied, with or without dilution with water, by a conventional coating technique. All of the drawbacks possessed by the conventional aqueous coating and powder coating are ingeniously overcome, and excellent working properties, dispersion stabilities and desirous film performancies unabl to be realized by the conventional slurry coating can be attained with the present coating composition.

The following Examples illustrate the invention, by comparison with Comparative Examples. Unless otherwise stated, all parts by weight.

EXAMPLE 1

Preparation of white-coloured coating composition (1)

aqueous resin (1) (solid): 109 parts
resinous fine powder (1): 23
cross-linking agent(1): 11
rutile type titanium dioxide: 50
deionized water: 150

The above mixture was placed in 900 ml glass vessel and stirred well by using a paint conditioner for 1.5 hour to obtain a white coloured coating composition (1).

Aqueous resin (1) (as aqueous varnish)
  monomer composition(weight %)
    N-(dimethylaminopropyl)methacrylamide: (15)
    styrene: (22.5)
    methyl methacrylate: (22.5)
    n-butyl acrylate: (30)
    2-hydroxyethyl acrylate: (10)
  neutralization with acetic acid nitrogen equivalent weight*: 1040 water tolerance (as herein defined): more than 10
surface tension**: 43 dyne/cm
neutralization %: 100%
solid content: 33 weight %
number average molecular weight ($\overline{Mn}$): 500

*... molecular weight/number of nitrogen atoms per molecule.
**... measured by using CB-VP type surface tension balance, manufactured by Kyowa Kagaku-sha, with 1% w/w aqueous solution.

Resinous fine powder (1)
  Finedic M 6102, polyester resin manufactured by Dainippon Ink Co., Ltd.
  Tm 100° C., hydroxyl value 30, acid vale 9
  $\overline{Mn}$ 4000

Cross-linking agent (1)
  Crelan, blocked isocyanate manufactured by Bayer A. G.

EXAMPLES 2~3 AND COMPARATIVE EXAMPLES 1~3

Coating compositions were prepared according to the method of Example 1, but using the materials shown in the following Table 1, respectively.

The aqueous resins, resinous fine powders and cross-linking agent indicated in Table 1 are as follows:

Aqueous resins

No. 2 ... nitrogen containing acrylic resin nitrogen equivalent weight 1570; water tolerance are more than 10; surface tension 47 dyne/cm; neutralization 100%; solid content 33 wt%; $\overline{Mn}$ 4500

No. 3 ... nitrogen containing acrylic resin nitrogen equivalent weight 390; water tolerance more than 10; surface tension 42 dyne/cm; neutralization 100%; solid content 33 wt %; $\overline{Mn}$ 4600

No. 4 ... amine modified epoxy resin nitrogen equivalent weight 1570; water tolerance 4; neutralization 60%; surface tension 44 dyne/cm; solid content 35 wt%; $\overline{Mn}$ 2500

No. 5 ... amine modified epoxy resin nitrogen equivalent weight 1100; water tolerance 5; neutralization 100% surface tension 41 dyne/cm; solid content 25 wt%; $\overline{Mn}$ 2200

No. 6 ... polyethyleneimine nitrogen equivalent weight 43; water tolerance more than 10; surface tension 48 dyne/cm; neutralization 50%; solid content 100 wt%; $\overline{Mn}$ 600

No. 7 ... polyethyleneimine nitrogen equivalent weight 43; water tolerance more than 10; surface tension 30 dyne/cm; neutralization 50%; solid content 100 wt%; $\overline{Mn}$ 1800

No. 8 ... polyethyleneimine nitrogen equivalent weight 43; water tolerance more than 10; surface tension 35 dyne/cm; neutralization 30%; solid content 30 wt%; $\overline{Mn}$ 15000

No. 9 ... nitrogen containing condensation resin nitrogen equivalent weight 850; water tolerance 4; surface tension 49 dyne/cm; neutralization 70%; solid content 50 wt%; $\overline{Mn}$ 2500

No. 10 ... nitrogen containing condensation resin nitrogen equivalent weight 2200; water tolerance 2; surface tension 38 dyne/cm; neutralization 90%; solid content 45 wt%; $\overline{Mn}$ 3500

No. 11 ... alkyd resin nitrogen equivalent weight -; water tolerance 2; surface tension 55 dyne/cm; neutralization 100%; solid content 30 wt%; $\overline{Mn}$ 1400

TABLE 1

| aqueous resin |
|---|

TABLE 1-continued

|  | (1) | (2) | (3) | (4) | (5) | (6) | (7) | (8) | (9) | (10) | (11) |
| --- | --- | --- | --- | --- | --- | --- | --- | --- | --- | --- | --- |
| Example 2 | — | 185 | — | — | — | — | — | — | — | — | — |
| 3 | — | — | 215 | — | — | — | — | — | — | — | — |
| 4 | — | — | — | 234 | — | — | — | — | — | — | — |
| 5 | — | — | — | — | 270 | — | — | — | — | — | — |
| 6 | — | — | — | — | — | 102 | — | — | — | — | — |
| 7 | — | — | — | — | — | — | 62 | — | — | — | — |
| 8 | — | — | — | — | — | — | — | 223 | — | — | — |
| 9 | — | — | — | — | — | — | — | — | 152 | — | — |
| 10 | 212 | — | — | — | — | — | — | — | — | — | — |
| Comp. Exam. 1 | — | — | — | — | — | — | — | — | — | 225 | — |
| 2 | — | — | — | — | — | — | — | — | — | — | 282 |
| 3 | — | — | 95 | — | — | — | — | — | — | — | — |

|  | resinous fine powder | | | | | | | | cross-link. | | TiO$_2$ | deion. water (parts) |
| --- | --- | --- | --- | --- | --- | --- | --- | --- | --- | --- | --- | --- |
|  | (1) | (2) | (3) | (4) | (5) | (6) | (7) | (8) | (1) | (2) |  |  |
| Example 2 | — | — | 51 | — | — | — | — | — | 8 | — | 53 | 41 |
| 3 | — | — | — | 39 | — | — | — | — | — | 11 | 71 | 60 |
| 4 | — | 30 | — | — | — | — | — | — | — | — | 45 | 27 |
| 5 | — | — | — | — | 22 | — | — | — | 11 | — | 57 | 18 |
| 6 | — | — | — | — | — | 84 | — | — | — | — | 41 | 117 |
| 7 | — | 72 | — | — | — | — | — | — | — | — | 60 | 144 |
| 8 | — | — | — | — | — | — | 70 | — | — | — | 43 | 32 |
| 9 | — | — | — | — | — | — | — | 29 | — | 12 | 45 | 104 |
| 10 | — | — | 47 | — | — | — | — | — | 11 | — | 41 | 23 |
| Comp. Exam. 1 | — | — | — | — | — | — | 50 | — | — | 14 | 44 | 33 |
| 2 | — | — | 38 | — | — | — | — | — | — | 18 | 100 | 45 |
| 3 | 74 | — | — | — | — | — | — | — | 6 | — | 45 | 150 |

Resinous fine powders

No. 2 . . . Finedic M 6107, polyester resin manufactured by Dainippon Ink Co. Ltd. Tm 110° C.; hydroxyl value 0; acid value 55; $\overline{\text{Mn}}$ 3800

No. 3 . . . RD-6360, epoxy containing acrylic resin manufactured by Mitsui Toatsu Kagaku; epoxy equivalent 473

No. 4 . . . Nylon-12, nylon resin manufactured by Unichika Co.

No. 5 . . . UM-8400, vinyl acetate modified polyethylene manufactured by Ube Kosan No. 6 . . . EP-1004, epoxy resin manufactured by Shell Chem.; epoxy equivalent 950

No. 7 . . . EP-1007, epoxy resin manufactured by Shell Chem.; epoxy equivalent 1850

No. 8 . . . Tafpren AP, sytrene-butadiene polymer manufactured by Asahi Kasei

Cross-linking agent

No. 2 . . . Cymel, hexamethoxymethylol melamine manufactured by Mitsui Toatsu Kagaku

EXAMPLE 11

The coating composition prepared in Example 1 was applied onto a dull steel plate so as to give 30μ dry thickness, and after setting for 30 minutes, the coating was heat-dried at 160° C. for 30 minutes, thereby effecting a three-dimensional cross-linking. The film performance (water resistance, corrosion resistance, alkaline resistance) and working property were examined and the results were shown in the following Table 2. Evaluation standards are as follows:

| working property mark | film thickness showing no pinholes | film thickness showing no sagging |
| --- | --- | --- |
| ⊚ | more than 50μ | more than 55μ |
| ○ | 40 to 50μ | 40 to 55μ |
| Δ | 35 to 40μ | 30 to 40μ |
| X | less than 35μ | less than 30μ |
| water resistance mark | after dipping in water (40° C.) for 240 hours | |
| ○ | no change | |
| Δ | slight loss of gloss | |
| X | severe loss of gloss - peeling | |
| corrosion resistance mark | cross-cutting, salt-spraying and then subjecting to tape peeling test | |
| ○ | tape-peeled width of less than 3 mm in each side, after salt spraying for 72 hours | |
| Δ | tape-peeled width of less than 3 mm in each side, after salt spraying for 24 hours and complete peeling after salt spraying for 72 hours | |
| X | complete peeling after salt spraying for 24 hours | |
| alkaline resistance mark | after dipping in 2% NoOH aqueous solution for 24 hours | |
| ○ | no change | |
| Δ | slight loss of gloss | |

| | -continued |
|---|---|
| X | discoloring, or generation of blister or peeling |

EXAMPLE 12

Baked dry coatings were prepared according to the procedures of Example 11 with the coating compositions of Examples 2 to 10 and Comparative Examples 1 to 3, respectively. Working properties and film performancies were shown in Table 2.

TABLE 2

|  | work. property | water resist. | corrosion resit. | alkaline reist. |
|---|---|---|---|---|
| Example 1 | ○~◎ | ○ | ○ | ○ |
| 2 | ○~◎ | ○ | ○ | ○ |
| 3 | ◎ | ○ | ○ | ○ |
| 4 | ○ | ○ | ○ | ○ |
| 5 | ◎ | ○ | ○ | ○ |
| 6 | ○ | ○ | ○ | ○ |
| 7 | ○~◎ | ○ | ○ | ○ |
| 8 | ○ | ○ | ○ | ○ |
| 9 | ◎ | ○ | ○ | ○ |
| 10 | ○~◎ | ○ | ○ | ○ |
| Compa. Example 1 | X | Δ | Δ | Δ |
| 2 | X | Δ | X | X |
| 3 | Δ | Δ | Δ | ○ |

EXAMPLE 13

To 110 parts of the coating composition of Example 1, were added 115 parts of deionized water to obtain a uniform aqueous dispersion (solid content about 17 wt%, pH 6~7). Using this as an electrodeposition bath, a zinc phosphate treated steel plate (cathode) was treated at 27° C., while applying 150 V current, for 2 minutes. Thereafter, the plate was baked at 180° C. for 30 minutes and a hard coating (35μ thickness; pencil hardness 2H) was obtained.

We claim:

1. An aqueous coating composition comprising from 45 to 98 parts by weight (solids) of aqueous resin(s) and from 2 to 55 parts by weight (solids) of finely divided water-insoluble resin(s), in which at least a part of said aqueous resin is selected from the cationic resins having amino group(s), the amino-nitrogen equivalent weight being 40 to 2000, and fulfilling the requirement that the water tolerance is greater than 4 and the surface tension for a 1% w/w aqueous solution is less than 51 dyne/cm.

2. A composition according to claim 1, which comprises at least 2 resins having functional groups which are mutually reactive at an elevated temperature.

3. A composition according to claim 1, wherein the cationic resin is selected from amine adduct of epoxy resin, amine adduct of modified epoxy resin, amino-bearing acrylic resin, amino-bearing polyester resin and polyethyleneimine resin.

4. A composition according to claim 1, 2 or 3, wherein the water-insoluble resin is selected from epoxy, polyester, alkyd, phenol, urethane, amino, vinyl, cellulose, polyamide, polycarbonate and fluorine resins.

5. A composition according to claim 4, wherein the mean diameter of the particles of the finely divided water-insoluble resin is from 0.5 to 100μ.

6. A composition according to claim 5, wherein the water-insoluble resin has a glass transition point of more than 40° C.

7. A composition according to claim 6 which comprises from 50 to 90 parts by weight (solids) of aqueous resin(s) and from 10 to 50 parts by weight (solids) of water-insoluble resin(s).

8. A composition according to claim 7, which additionally comprises a polar organic solvent.

* * * * *